United States Patent [19]
Arndt et al.

[11] Patent Number: 5,883,707
[45] Date of Patent: Mar. 16, 1999

[54] METHOD AND DEVICE FOR SENSING THREE-DIMENSIONAL FLOW STRUCTURES

[75] Inventors: Stefan Arndt, Stuttgart; Klaus Reymann; Michael Huebel, both of Gerlinger, all of Germany

[73] Assignee: Robert Bosch GmbH, Stuttgart, Germany

[21] Appl. No.: 924,804

[22] Filed: Sep. 5, 1997

[30] Foreign Application Priority Data

Sep. 5, 1996 [DE] Germany .................. 196 35 985.6

[51] Int. Cl.⁶ .......................... G01F 1/712; G01P 3/36
[52] U.S. Cl. .......................... 356/28; 73/861.06
[58] Field of Search .................. 356/28; 73/861.06

[56] References Cited

U.S. PATENT DOCUMENTS

| | | |
|---|---|---|
| 4,919,536 | 4/1990 | Komine . |
| 4,989,969 | 2/1991 | Siebert et al. ............ 356/28 |
| 5,440,144 | 8/1995 | Raffel et al. . |
| 5,561,515 | 10/1996 | Hairston et al. ........... 356/28 |
| 5,703,679 | 12/1997 | Morbieu ................ 356/28 X |

FOREIGN PATENT DOCUMENTS

| | | |
|---|---|---|
| 35 31969 A1 | 3/1986 | Germany . |
| 35 44 347 C1 | 6/1987 | Germany . |
| 41 18 716 A1 | 1/1992 | Germany . |
| 42 00 309 A1 | 7/1993 | Germany . |
| 42 37 440 C1 | 3/1994 | Germany . |
| 43 13 682 C2 | 10/1994 | Germany . |
| 44 26 956 C2 | 2/1996 | Germany . |
| 29601 159 U1 | 5/1996 | Germany . |
| 44 43 069 A1 | 6/1996 | Germany . |
| 15 93 474 | 7/1981 | United Kingdom . |
| 20 80 521 | 2/1982 | United Kingdom . |
| 22 95 670 | 6/1996 | United Kingdom . |
| WO93/03 667 A1 | 4/1993 | WIPO . |

*Primary Examiner*—Mark Hellner
*Attorney, Agent, or Firm*—Kenyon & Kenyon

[57] ABSTRACT

A method and device for sensing three-dimensional flow structures, which is distinguished in that at least two, preferably three light sheets of a different wavelength or light intensity are produced in a flow measuring field. When a particle carried along by the flow traverses the light sheet, scattered light produced by the particle is optically detected as a particle trace, separately for each light sheet. The detected particle traces of the light sheets are combined into one particle path, and on the basis of the composite particle path, the three velocity components of the flow are calculated.

16 Claims, 3 Drawing Sheets

METHOD AND DEVICE FOR SENSING THREE-DIMENSIONAL FLOW STRUCTURES

FIELD OF THE INVENTION

The present invention relates to a method and a device for sensing three-dimensional flow structures. More particularly, the present invention relates to a device for sensing three-dimensional flow structures including a light source for producing a sheet of light, a pick-up device (e.g., receiver or recording device) assigned to the sheet of light for detecting scattered light produced by a particle passing through the sheet of light, an analyzer and control means.

BACKGROUND INFORMATION

Flow velocimeters (anemometers) are generally known, e.g., laser Doppler velocimeters, which permit a point-for-point measuring of flow fields. These methods are very time-consuming because they are based solely on point-for-point measuring. For that reason, there is a need for whole-field methods in order to simultaneously sense spatial (e.g., three-dimensional) turbulence structures.

Previously, only two-dimensional methods, such as the laser light-sectioning method using real-time vectorization and particle image velocimetry (PIV) were known. However, these methods require a sequential sampling of the flow field, in the sense that three-dimensional structures are examined by arranging a plurality of light sheets side-by-side, which are to be received in time succession.

The disadvantage of these known methods is that they are not applicable to many technically relevant flow problems. This is particularly true when the flow is unsteady and when the velocity components normal to the light sheet (examination plane) are large, and when, due to the lack of optical means, the apparatus configuration does not permit light sheets in the principal flow direction.

SUMMARY OF THE INVENTION

In contrast, an advantage of the method and device according to the present invention is that even flow fields that are not able to be analyzed using existing methods are able to be sensed three-dimensionally. This is achieved, in particular, in that besides a single light sheet, additional light sheets of different wavelengths can be provided, parallel to one another, or spatially offset from one another, in any desired manner. This multi-layer arrangement of light sheets makes it possible for the third velocity component to be determined, without having to sequentially sample the flow field.

The number of light sheets can also be increased by, in addition to using color coding, varying the polarization plane of the wavelength in question (perpendicular/horizontal polarization). For example, with three wavelengths, one can generate six light sheets, which are able to be selectively analyzed.

It is especially advantageous when the light for producing the light sheets is intensity-modulated as a function of time, e.g., using a Bragg cell. This intensity modulation is repeated in the scattered light of the particles (tracer particles) carried along in the flow field. By this means, the beginning and end point, as well as the direction of the scattered particles are able to be clearly identified (arrow coding) by the light-receiving device.

In one embodiment of the present invention, provision is made for one single light source to produce the light sheets, preferably a laser, which radiates light of different wavelengths. A color splitter splits the polychromatic light into individual wavelengths. In the case of variably polarized light sheets, the splitting is additionally carried out by means of polarization.

In another embodiment of the present invention, instead of the one light source, provision is made for a plurality of light sources, preferably lasers, each having a different wavelength and each producing one light sheet.

Preferably, the light-receiving devices assigned to the light sheets comprise inexpensive CCD arrays, which feed the received image to a computer for further processing.

In a further embodiment of the present invention, each light-receiving device has an assigned positioning device, enabling a precise focusing on the corresponding light sheet. By this means, the quality of the measuring result can be further enhanced.

Since a plurality of CCD arrays are preferably used to detect the scattered light produced in the light sheets, it is necessary for monochromators or interference filters and, in some instances, polarization filters to be connected on the incoming side of the CCD arrays in the path of the rays, in order to filter out the scattered light of those light sheets which are not assigned.

It is also advantageous to replace the light-receiving devices by a single color-picture video camera or color-picture photo camera, which will make an assignment to the light sheet in question based on the color of the scattered light that is detected. This represents a simplification of the design.

An alternative possibility is to create a wide light section having a continuous color variation (in the third dimension) and to detect the scattered light using a color-picture video camera. By selecting an appropriate lens or by means of dimming (e.g., stepping down), one is able to form a sharp image of the entire light section width. As a light source, an intensive white light source or a white light laser can be used with subsequent spectral splitting (e.g., prism, grating) and light sectioning optics.

DETAILED DESCRIPTION

Figure 1:
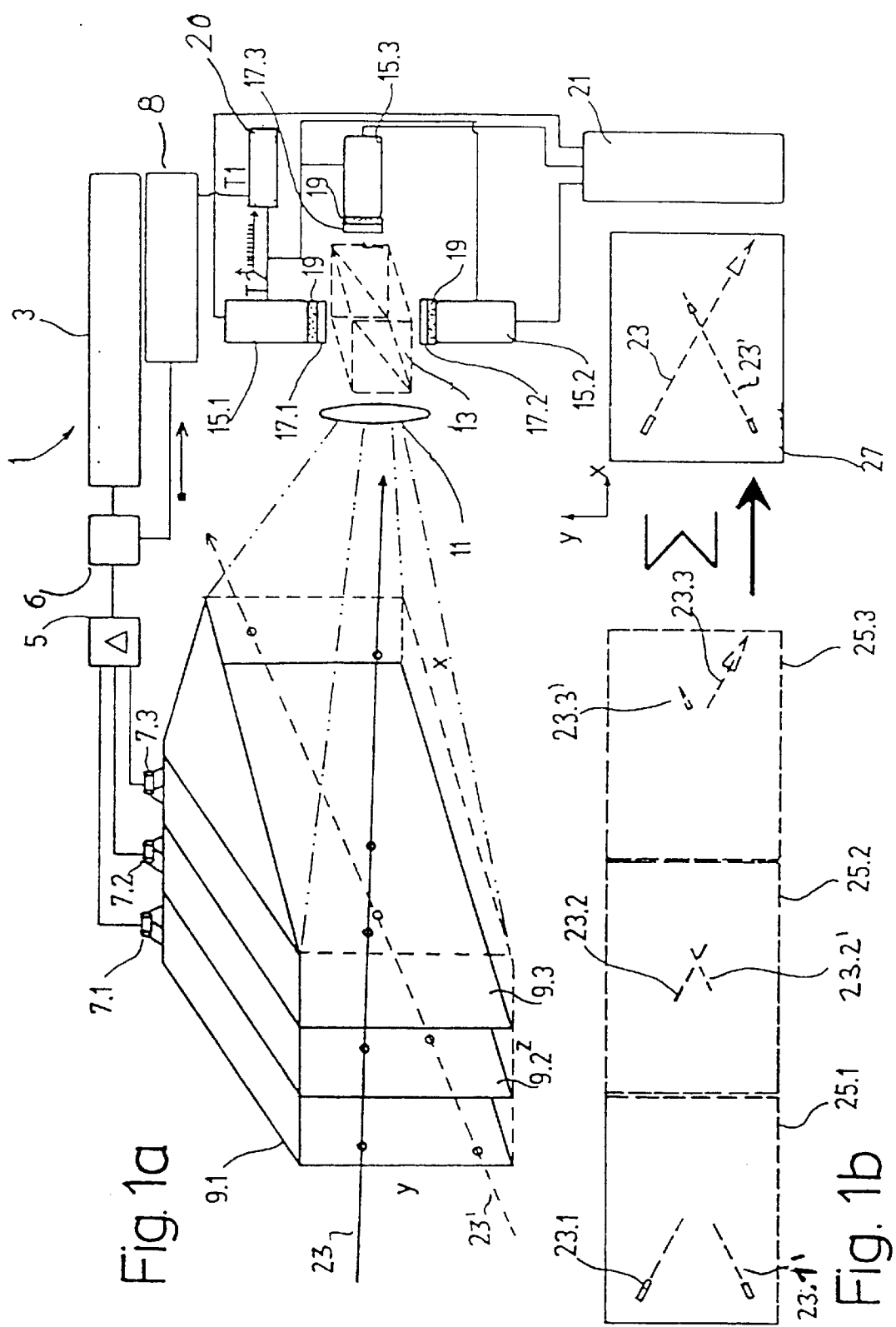
FIG. 1a is a schematic representation of an exemplary device according to an embodiment of the present invention.
FIG. 1b is a schematic representation of exemplary images picked up by the device according to an embodiment of the present invention.

FIG. 1 shows an exemplary embodiment of the present invention including a measuring device 1, comprising an argon laser 3, which produces, inter alia, light having wavelengths of 476.5 nm, 488 nm, and 514 nm. The light produced by the laser is fed to a color splitter 5, which splits the light into individual colors or wavelengths. Arranged in the path of the rays between laser 3 and color splitter 5 is a Bragg cell 6 which is used to control the intensity of the light, the control being carried out by means of arrow generator 8. The split light radiation beam is then fed to each optical system 7.1, 7.2, or 7.3, which produces "light sheets" 9.1–9.3.

As a function of the color separation, the three light sheets 9.1, 9.2, 9.3 are clearly differentiated by their wavelengths.

Assigned to the light sheets 9.1–9.3 is a lens 11, which feeds light arriving from light sheets 9.1–9.3 as collimated light to a beam splitter 13. Beam splitter 13 directs the incoming light to the three light-receiving devices 15.1–15.3. Positioning devices 17.1, 17.2 and 17.3 focus the individual light-receiving devices on the specific light sheet (e.g., section plane). By this means, one is able to have a definitive allocation of a light-receiving device 15.1–15.3 to a light sheet 9.1–9.3.

In the exemplary embodiment shown in FIG. 1, light-receiving device 15.1 is assigned to light sheet 9.1, light-receiving device 15.2 to light sheet 9.2, and light-receiving device 15.3 to light sheet 9.3.

Connected on the incoming side of each light-receiving device 15 is a filter or a monochromator 19, which does not permit light of an undesired wavelength to pass through. In the present case, the undesired wavelengths are those that the other light-receiving devices 15 receive.

The light beams are received from the light sheets 9 in the light-receiving devices 15 by means of CCD arrays (not shown), which then feed their image information to a computer 21 (only shown schematically) for evaluation and further processing, in particular for digitization and storage.

For controlling synchonization, as a function of time, arrow generators 8 and light-receiving devices 15, provision is made for a trigger unit 20 to transmit trigger signals T1 to arrow generator 8 and trigger signals T2 to the light receiving devices 15.

Figure 2:
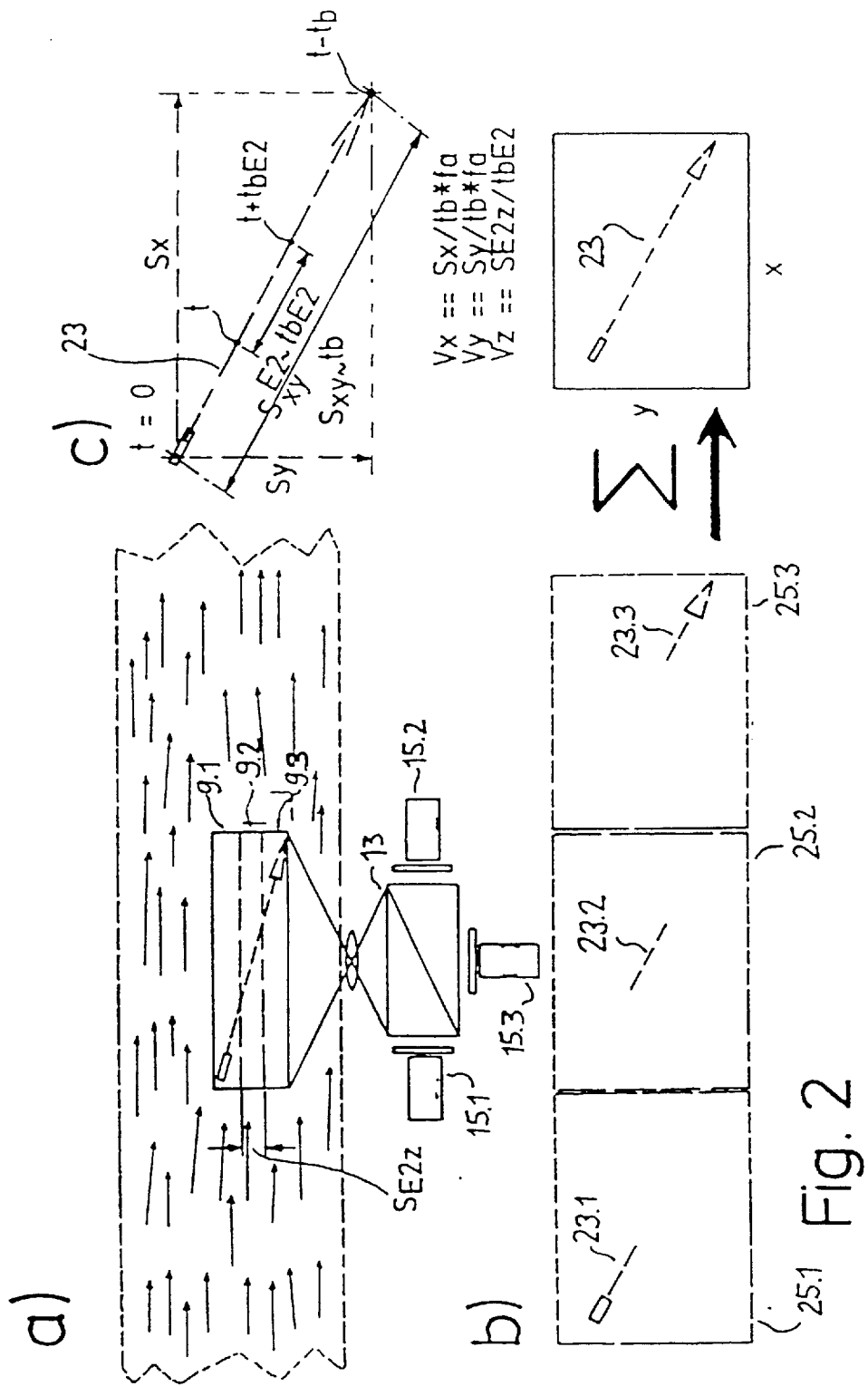
FIG. 2a is a first schematic representation illustrating the calculation of velocity components according to an embodiment of the present invention.
FIG. 2b is a second schematic representation illustrating the calculation of velocity components according to an embodiment of the present invention.
FIG. 2c is a third schematic representation illustrating the calculation of velocity components according to an embodiment of the present invention.
FIG. 2d is a fourth schematic representation illustrating the calculation of velocity components according to an embodiment of the present invention.

In the flow field to be analyzed, as shown, for example, in FIG. 2a, light sheets 9 are produced in parallel to and spatially offset from one another, their longitudinal axes pointing in the primary flow direction.

To measure the flow field, particles that are carried along by the flow are used, which are either present naturally or are deliberately added. When a light sheet is traversed, light is reflected off of each particle and arrives as scattered light at lens 11. Scattered light of this kind is able to be detected by the three light-receiving devices 15, from the instant of entry, for example, into light sheet 9.1 until emergence from light sheet 9.3. Thus, the images generated by the CCD arrays of light-receiving devices 15 produce particle traces 23, 23' as shown illustratively in FIGS. 1a and 1b. In this context, particle trace 23.1, 23.1' correspond to the path in light sheet 9.1, particle trace 23.2, 23.2' to the path in light sheet 9.2, and particle trace 23.3, 23.3' to the path in light sheet 9.3. The end of particle trace 23.1, 23.1' featured in the drawing and the arrowhead of particle trace 23.3, 23.3' result from the intensity modulation in time of the laser light by means of Bragg cell 6 and arrow generator 8 (arrow coding) and indicate, accordingly, whether the particle to be examined had resided in the area of the light sheets for the entire exposure time. This means that, at the start of the exposure time, the location of the detected particle was at the beginning of particle trace 23.1, 23.1' and, at the end of exposure time, at the arrowhead of particle trace 23.3, 23.3'.

For analysis purposes, computer 21, which includes a frame grabber unit, combines these three individual images 25.1, 25.2 and 25.3 into a collective image 27. The resultant composite particle trace 23, 23' is a direct reproduction of the particle's pattern of motion in the x/y plane.

With the aid of the exposure time $t_b$ and an image scale $f_a$ of the total light-receiving optical system, the velocity components in the x- and y- direction, $v_x$, and $v_y$ are able to be calculated. The x-/y-path components $s_x$, and $s_y$ of particle trace 23 are sketched in a diagram of FIG. 2c. Based on these parameters, the following velocity components follow:

$$v_x = (S_x/t_b)f_a$$

$$v_y = (S_y/t_b)f_a.$$

The third velocity component $v_z$ is calculated indirectly on the basis of the residence time of the particle, e.g., in middle light sheet 9.2. To this end, an additional time structure is impressed upon the particle trace, for instance by means of multiple exposure or by modulating the laser radiation. This yields the time $t_{bE2}$ shown in the diagram of FIG. 2a, which corresponds to the particle's residence time in light sheet 9.2. With the aid of path $S_{E2z}$ traveled in this light sheet, in the z-direction the third velocity component is calculated as $$v_z = S_{E2z}/t_{bE2}.$$

Moreover, the residence time $t_{bE2}$ can also be calculated by determining the ratio of particle trace 23.2 of middle light sheet 9.2 to the total length of particle trace 23.

Thus, the ratio between residence time $t_{bE2}$ and exposure time $t_b$ corresponds to the ratio between length $S_{E2z}$ of particle trace 23.2 and the total length of particle trace 23. However, the condition for this is that the trace be identified in all three light sheets, and that the beginning and end be found in the two outer sheets.

Figure 3:
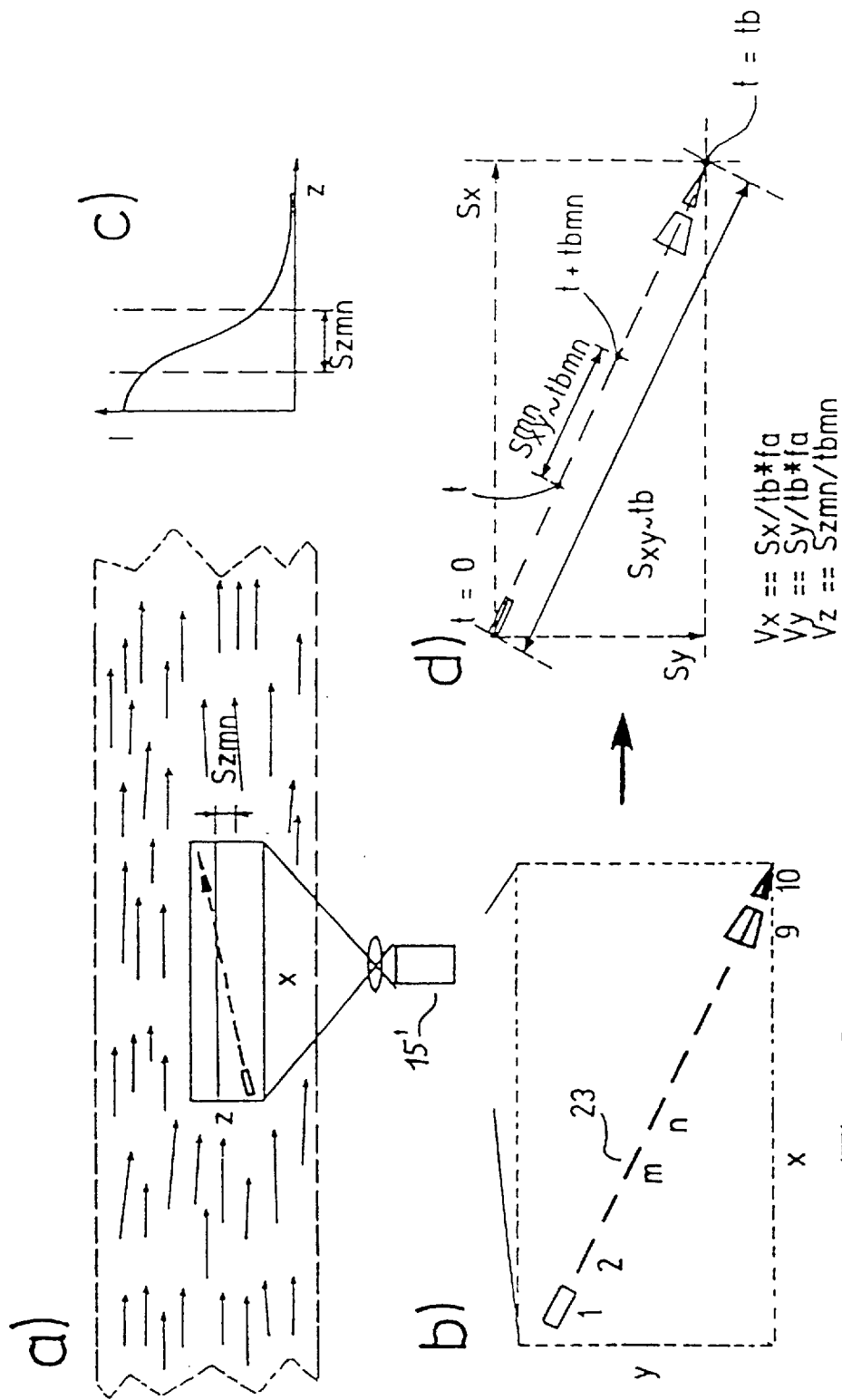
FIG. 3a is a first representation illustrating the calculation of velocity components according to a second embodiment of the present invention.
FIG. 3b is a second representation illustrating the calculation of velocity components according to a second embodiment of the present invention.
FIG. 3c is a third representation illustrating the calculation of velocity components according to a second embodiment of the present invention.
FIG. 3d is a fourth representation illustrating the calculation of velocity components according to a second embodiment of the present invention.

Another possibility for measuring the z-component is illustrated in FIG. 3. In this case, a light sheet is asymmetrically intensity-modulated in the z-direction, the light intensity pattern being given in the diagram shown in FIG. 3c, here half of a Gaussian curve. The light-receiving device, in the present exemplary embodiment, a video camera 15', is designed to also be capable of detecting different light intensities. On the basis of the detected light intensity, one can infer the z-position of the particle within the light sheet. Thus, by retrieving the intensity values from the beginning and end point of particle trace 23, the distance $S_{zmn}$ traversed in the z-direction is determined on the basis of the intensity distribution. In FIG. 3b, the various light intensities of particle trace 23 are characterized by values 1, 2, m, n, 9, 10. With the aid of value $S_{zmn}$, as shown in FIG. 3d, the velocity component is obtained as follows:

$$v_z = S_{zmn}/t_{bmn}.$$

Of course, to determine the z-component, one can also draw upon other intensity values of particle trace 23, e.g., the intensity value upon entrance into the middle light sheet, and the intensity value upon emergence from the middle light sheet.

Besides the pick-up optical system comprising three light-receiving devices, as disclosed in the exemplary embodiment, it is likewise possible to use a light-receiving system having just one light-receiving device, e.g., a camera or a highspeed camera with high-sensitivity resolution.

What is claimed is:

1. A method for sensing a three-dimensional flow structure including at least one particle carried along by the flow, comprising the steps of:

producing a plurality of light sheets in a flow measuring field wherein each of the plurality of light sheets has at least one of a distinct wavelength, a distinct light intensity and a distinct polarization;

optically detecting as a particle trace, for each of the plurality of light sheets, a scattered light produced by particles traversing each of the plurality of light sheets;

recording the detected particle traces as one of a color-coded particle trace and a polarization-coded particle trace;

combining the detected particle traces into a composite particle path; and calculating a first velocity component, a second velocity component, and a third velocity component of the flow as a function of the composite particle path.

2. The method according to claim 1 wherein the first velocity component and the second velocity component are calculated as a function of an exposure time and an image scale of an optical light-receiving device.

3. The method according to claim 2 wherein a residence time of a particle of the particles in at least one light sheet is detected, the third velocity component being determined as a function of the residence time.

4. The method according to claim 2, wherein one of the plurality of light sheets is asymmetrically light intensity-modulated in a third direction, a location of a particle of the particles being determined as a function of an intensity of the detected particle trace, the third velocity component being determined as a function of the location.

5. The method according to claim 1, further comprising the step of:

using the first calculated velocity component, the second calculated velocity component, and the third calculated velocity component as a data base for calculation of a three-dimensional representation of an entire spatial flow field.

6. The method according to claim 1, further comprising the step of using image information from selected tomographic sheets for a qualitative representation of the three-dimensional flow structure.

7. A device for sensing a three-dimensional flow structure including at least one particle carried along by the flow, comprising:

a first light source for producing a first light sheet;

a first pick-up device assigned to the first light sheet for detecting a scattered light produced by the at least one particle passing through the first light sheet;

at least one additional light source for producing at least one additional light sheet differing from the first light sheet in one of a wavelength, a light intensity, and a polarization, the at least one additional light sheet being arranged in a predetermined spatial position;

at least one additional pick-up device assigned to the at least one additional light sheet for detecting a scattered light produced by the at least one particle when passing through the at least one additional light sheet;

an analyzer coupled to the first and at least one additional pick-up device; and a control unit coupled to the analyzer.

8. The device according to claim 7, wherein the first light source includes a laser.

9. The device according to claim 7, wherein the first light source and the at least one additional light source are combined into a polychrome laser, and further comprising one of a color splitter and a polarization device which splits an output from the light sources into a plurality of components forming the first and at least one additional light sheet.

10. The device according to claim 7, wherein one of the first pick-up device and the at least one additional pick up device has a CCD field.

11. The device according to claim 10, wherein the first pick-up device includes an assigned positioning device for focusing onto the first light sheet.

12. The device according to claim 10, wherein one of the first pick-up device and the at least one additional pick-up device has one of a filter and a monochromator connected on an incoming side to the CCD field.

13. The device according to claim 7, further comprising:

a beam splitter located between the light sheets and the respective pick-up devices which divides light coming from the light sheets and feeds the light to one of the first pick-up device and the at least one additional pick up-device.

14. The device according to claim 13, further comprising: a lens connected to an incoming side of the beam splitter.

15. The device according to claim 7, wherein one of the first pick-up device and the at least one additional pick-up device includes one of a color-picture video camera and a color-picture photo camera.

16. The device according to claim 7, wherein a light intensity pattern of one of the first light sheet and the at least one additional light sheet corresponds to half of a Gaussian curve.

\* \* \* \* \*